United States Patent
Dorgelo et al.

(10) Patent No.: US 8,659,983 B2
(45) Date of Patent: Feb. 25, 2014

(54) BLU-RAY OPTICAL PICK-UP DEVICES AND METHODS

(75) Inventors: Jeroen Dorgelo, Eindhoven (NL); Mats Oberg, Cupertino, CA (US); Antonius Leonardus Johannes Dekker, Eindhoven (NL)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 13/551,053

(22) Filed: Jul. 17, 2012

(65) Prior Publication Data

US 2013/0021888 A1 Jan. 24, 2013

Related U.S. Application Data

(60) Provisional application No. 61/510,860, filed on Jul. 22, 2011, provisional application No. 61/535,245, filed on Sep. 15, 2011, provisional application No. 61/651,168, filed on May 24, 2012.

(51) Int. Cl.
   *G11B 7/00* (2006.01)
(52) U.S. Cl.
   USPC ............... 369/59.23; 369/44.25; 369/112.01; 369/44.32
(58) Field of Classification Search
   None
   See application file for complete search history.

(56) References Cited

U.S. PATENT DOCUMENTS

| | | | |
|---|---|---|---|
| 2006/0044986 A1* | 3/2006 | Martens et al. | 369/112.01 |
| 2006/0268669 A1 | 11/2006 | Kaji et al. | |
| 2006/0280102 A1* | 12/2006 | Bell et al. | 369/112.23 |
| 2010/0027402 A1 | 2/2010 | Iwata et al. | |
| 2010/0226234 A1 | 9/2010 | Katayama | |
| 2011/0075542 A1 | 3/2011 | Inoue et al. | |

OTHER PUBLICATIONS

ECMA: "ECMA-364—Data Interchange on 120mm and 80mm Optical Disk using +R DL format—Capacity: 8,55 and 2,66 Gbytes per Side," Jun. 1, 2005, XP55007025, http://www.ecma-international.org/publications/files/ECMA-ST-WITHDRAW/ECMA-364, $1^{st}$ edition, Jun. 2005 (retrieved on Sep. 13, 2011), p. 7-12.

Anonymous, "White Paper Blu-Ray Disc Format General," White Paper Blu-Ray Disc Format General, $2^{nd}$ edition, Oct. 1, 2010, pp. 1-45, XP007921220.

White paper Blu-ray Disc Format, 1. A. Physical Format Specifications for BD-RE (Second Edition), Internet Citation, Feb. 1, 2006, 33 pp., XP007919141, http://www.blu-raydisc.com/Assets/Dowloadablefile/BD-REwhitepaper20060227clean-15266.pdf, retrieved on Feb. 25, 2010.

International Search Report and Written Opinion mailed Nov. 20, 2012 in counterpart International Application No. PCT/US2012/047019.

* cited by examiner

*Primary Examiner* — Van Chow

(57) ABSTRACT

New and useful methods and systems for reading optical discs, such as multi-layer Blu-ray discs are disclosed. For example, in an embodiment a device for reading two-layered optical discs includes a laser diode capable of emitting light, a set of optics including a fixed collimator, the set of optics providing a numerical aperture (NA) of substantially less than 0.85, and a detector for detecting laser light focused on a two-layer optical disc to produce a stream of detected bits.

22 Claims, 4 Drawing Sheets

BLU-RAY OPTICAL PICK-UP DEVICES AND METHODS

INCORPORATION BY REFERENCE

This application claims the benefit of U.S. Provisional Application No. 61/510,860 entitled "Fixed Collimator Optical Pick-Up Unit for BluRay" filed on Jul. 22, 2011, U.S. Provisional Application No. 61/535,245 entitled "BDROM" filed on Sep. 15, 2011, and U.S. Provisional Application No. 61/651,168 entitled "Read Performance with Low NA Bluray OPU" filed May 24, 2012. The entire disclosures of the prior applications are incorporated herein by reference in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

For each type of optical disc, there exists a multitude of standards that manufacturers adhere to in order for the industry as a whole to produce a variety of conforming and functional products. Blu-ray, also known as Blu-ray Disc (BD) is the name of a recent optical disc standard that is currently replacing the DVD standard. Blu-ray offers more than five times the storage capacity of traditional DVDs and can hold up to 25 giga-bytes on a single-layer disc, and 50 giga-bytes on a dual-layer disc. Unfortunately, the hardware required for Blu-ray players is substantially more expensive than for other optical systems.

Generally, Blu-ray systems are designed using a host of standards that together provide advantage over conventional DVD systems. For example, Blu-ray systems are specified to use a blue-violet laser having a wavelength of 405 nm (as compared to the 650 nm wavelength used by DVDs) and use a higher numerical aperture (NA) than DVDs, i.e., 0.85 for Blu-ray compared to 0.6 for DVDs with a collimator motor to enable Blu-ray systems to reliably read dual layered discs.

SUMMARY

Various aspects and embodiments of the invention are described in further detail below.

In an embodiment, a device for reading multi-layered optical discs includes a laser diode capable of emitting light, a set of optics including a fixed collimator, the set of optics providing a numerical aperture (NA) of substantially less than 0.85, and a detector for detecting laser light focused on a two-layer optical disc to produce a stream of detected bits.

In another embodiment, a method for reading multi-layered optical discs is disclosed. The method includes emitting light through a set of optics including a fixed collimator, the set of optics providing a numerical aperture (NA) of substantially less than 0.85, and detecting laser light focused on a multi-layer optical disc to produce a stream of detected bits.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The disclosed methods and systems below may be described generally, as well as in terms of specific examples and/or specific embodiments. For instances where references are made to detailed examples and/or embodiments, it is noted that any of the underlying principles described are not to be limited to a single embodiment, but may be expanded for use with any of the other methods and systems described herein as will be understood by one of ordinary skill in the art unless otherwise stated specifically.

As collimator motors and other moving parts tend to add substantial costs and lower reliability, it becomes economical to design an optical pick-up (OPU) with a non-moving collimator assuming that read errors can be maintained at a sufficiently low rate.

While the examples and illustrations below are directed to Blu-ray technology, standards, methods and devices for ease of explanation, it is to be appreciated that the methods and systems disclosed below may be similarly applied to other multi-layer optical technologies employing multiple data layers.

Figure 1:
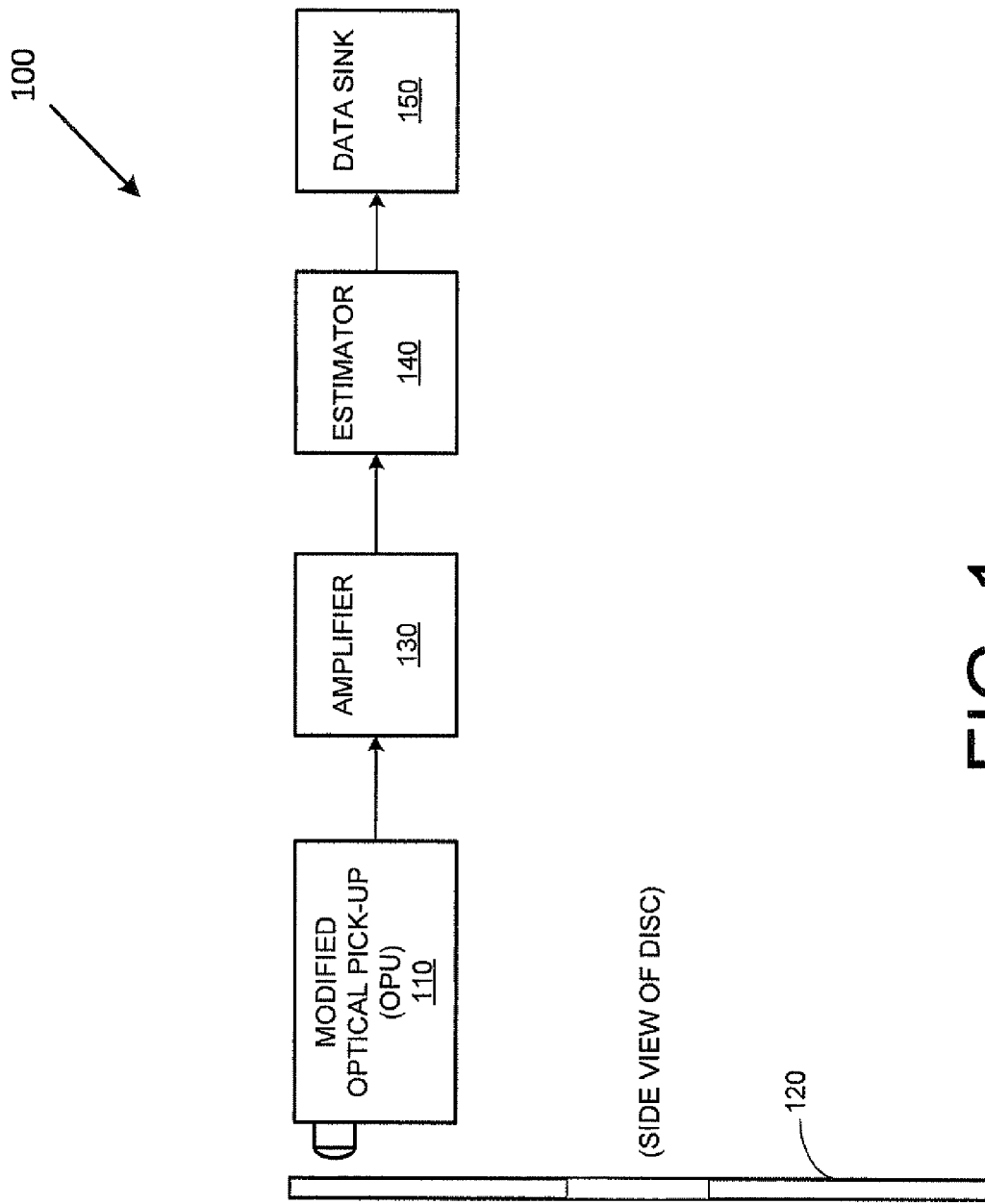
FIG. 1 is an example Blu-ray device having an Optical Pick-Up (OPU) device that does not require a collimator motor.

FIG. 1 is an example Blu-ray device 100 having a non-moving (fixed) collimator (not-shown in FIG. 1). The example Blu-ray device 100 includes a modified OPU 110 located in proximity to a Blu-ray disc 120, an amplifier 130, an estimator 140 and a data sink 150. In the example of FIG. 1, the Blu-ray disc 120 is a dual-layered disc having a first layer (L0) and a second layer (L1).

In operation, as the Blu-ray disc 120 spins, the modified OPU 110 uses a modified set of optics (described below) with a fixed collimator to detect strings of shaped pits embedded in the Blu-ray disc 120 to produce a detected signal. The detected signal includes a waveform representational of a string of pits in a particular track of the disc 120 plus inter-symbol interference (ISI) and cross-talk caused by neighboring pits of adjacent tracks and by pits in both layers.

The amplifier 130 receives the detected signal from the OPU 110, and buffers and amplifies pick-up signal to create an amplified signal.

The estimator 140 receives the amplified signal from the amplifier 130, then performs an estimation process to remove the ISI. The estimator 140 of the present example is a Partial Response Maximum Likelihood (PRML) based device using a Viterbi algorithm. However, other forms of estimators and algorithms may be employed from embodiment to embodiment to remove ISI as may be found necessary or otherwise advantageous. As the estimator 140 performs its estimation process, the estimator 140 produces a stream of bits containing information of interests (e.g., audio-visual signals), and provides the stream of estimated bits to the data sink 150, which for the present example can be a Blu-ray compatible television or any number of other audio-visual devices.

Figure 2:
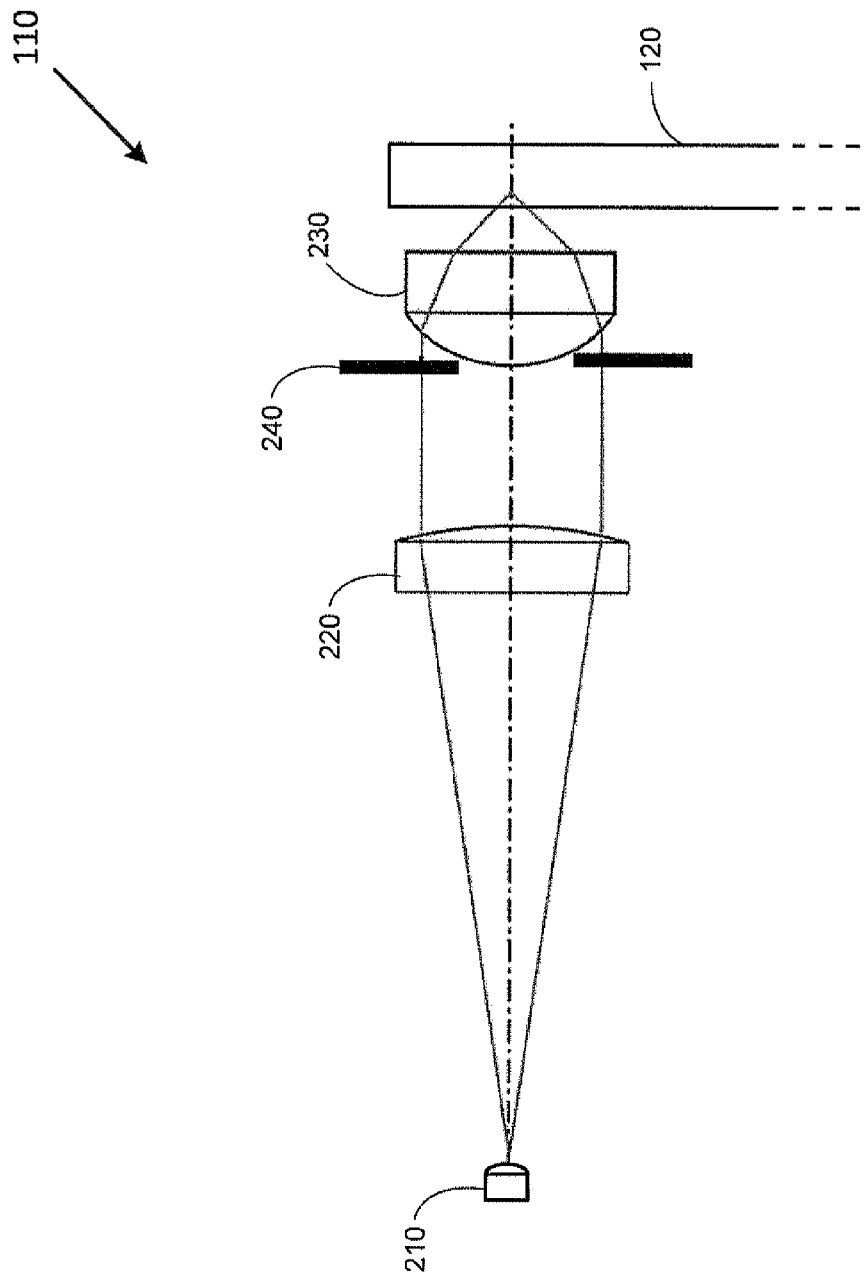
FIG. 2 is an example of OPU optics having a reduced Numerical Aperture (NA).

FIG. 2 shows details of the example OPU 110 of FIG. 1. The example OPU 110 includes a laser diode 210, a fixed collimator 220, an objective lens 230 and an optical stop 240.

In operation, laser light provided by the laser diode 210 passes through the fixed collimator 220 to the objective lens 230, which in turn focuses light to a spot on disc 120. The optical stop 240 is added to reduce the NA of the OPU 110 to a level appreciably below 0.85. However, it is to be appreciated that the example optics of FIG. 2 can be simplified in other embodiments so as to not require an optical stop. An appropriately configured detector (not shown) is used to detect pit formations on disc 120 illuminated by the laser diode 210.

Historically, the Blu-ray standard was designed so that discs could be read using limit equalizer technology. To achieve this goal, NA was specified at 0.85, and a moving collimator was required to compensate for Spherical Aberrations (SA) caused by the high NA and the thin cover layer inherent in Blu-ray discs.

In an example, by setting the optical path length (i.e., the distance from a cover of an optical disc to a focal point within the optical disc) to exactly (or approximately) 87.5 um, which is the half-way point between 75 um for layer L1 and 100 um for layer L0 (instead of the normal 100 um), and by reducing the NA substantially below 0.85, e.g., to NA=0.75, NA=0.65 or somewhere there between, a Blu-ray reading system can be produced without the need of a moving collimator.

In another example, the optical path length does not need to be set at the exactly half-way point. The optical path length can be set at any point from 75 um to 100 um.

The benefits of a smaller NA can include a larger spot size, which in turn provides larger focus margin, greater tilt margin, greater SA margin and possible simplified optical design.

Lowering the NA can increase ISI, increase crosstalk and result in a smaller push-pull modulation.

However, by using the appropriate post-processing, such as the PRML/Viterbi processing discussed with respect to FIG. 1, such disadvantages may be effectively addressed. While such post-processing hardware may increase the costs of electronics, the savings of removing a variety of moving parts (plus electronic control mechanisms and more complex optics) outweigh the increased costs of the extra post-processing electronics.

Figure 3:
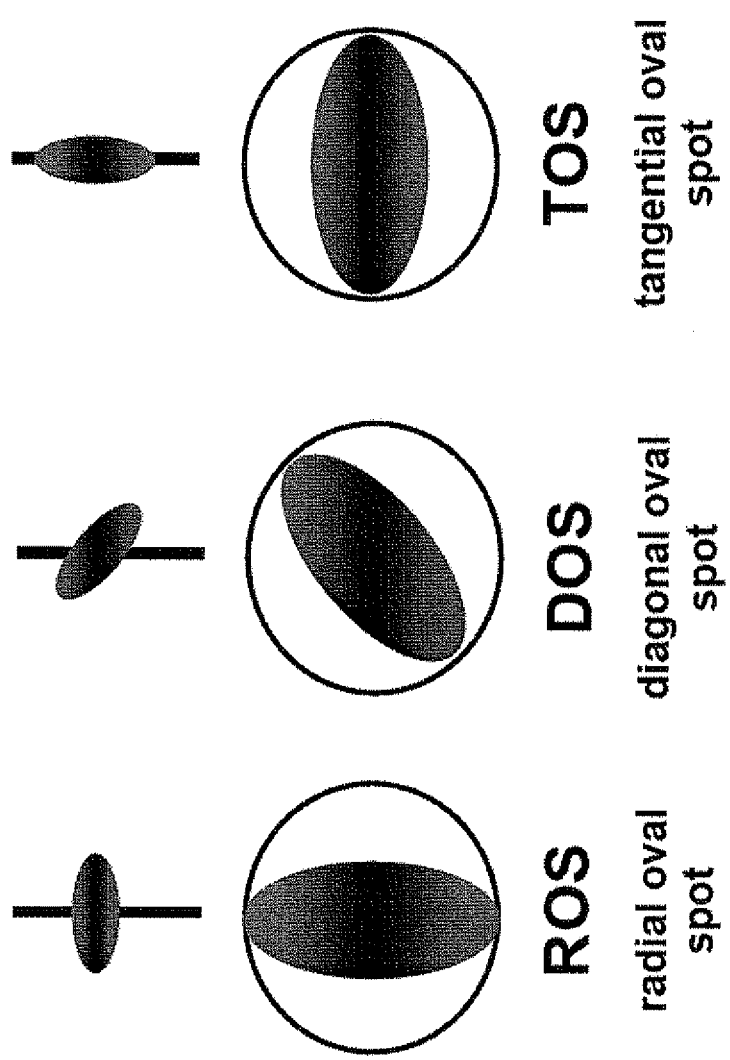
FIG. 3 depicts various laser spot formations of interest.

FIG. 3 depicts a variety of spot patterns produced by various laser diodes. Due to the construction of semiconductor lasers, the resultant spot intensity profile of a laser diode will have an oval shape. By adjusting the mounting angle of a laser diode, three different oval patterns may be created including a radial oval spot (ROS), a diagonal oval spot (DOS) and a tangential oval spot (TOS). While any of the ROS, DOS or TOS profiles may be used, the TOS has the benefit of minimizing cross-talk at the expense of increased ISI. However, as ISI can be effectively addressed using PRML or other estimation techniques, the disadvantages of a TOS can be effectively addressed.

Figure 4:
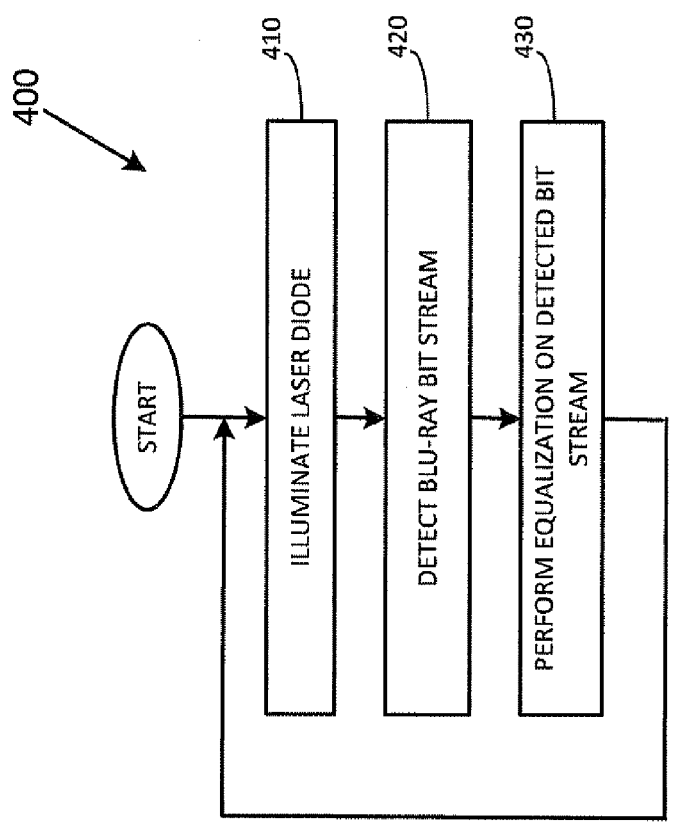
FIG. 4 is a flowchart outlining an example approach reading Blu-ray discs.

FIG. 4 is a flowchart 400 outlining an example approach for detecting signal from a Blu-ray disc using an OPU having a fixed collimator.

At 410, a laser diode having a wavelength of 405 nm (blue-violet light) is illuminated so as to provide light through a set of optics that includes a fixed collimator and an objective lens to the surface of a Blu-ray disc. As discussed above, in an example, the optical path length of the optics can be set exactly or approximately to 87.5 um, and NA can be reduced substantially below 0.85, e.g., to NA=0.75, NA=0.65 or somewhere there between. In another example, the optical path length of the optics can be set at any point from 75 um to 100 um. At 420, a stream of pits in the Blu-ray disc is detected, buffered and amplified. Then, at 430, the detected/buffered/amplified signal is processed according to an estimation process, such as the PRML/Viterbi algorithm discussed above, to produce a stream of estimated bits, which may thereafter be provided to any number of devices, such as a Blu-ray compatible television.

In an example, performance of a first Blu-ray OPU with NA being 0.85 is compared with performance of a second Blu-ray OPU with NA being 0.75. Specifically, a number of error corrections, such as long distance code (LDC) corrections, is used to compare the performance of the two Blu-ray OPUs. The results indicate that the second Blu-ray OPU has comparable performance to the first Blu-ray OPU.

Because lower NA increases margins for defocusing and aberrations (e.g., astigmatism, coma and spherical), a system having a Blu-ray OPU of a lower NA, such as the second Blu-ray OPU, is more robust. In addition, lower NA allows for a simpler lens design, in particular for single lens systems, and a thinner lens overall. Thus, the lower NA yields cost saving for the OPU and enables more compact lens design.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A device for reading multi-layered optical discs, comprising:
    a laser diode capable of emitting light;
    a set of optics including a fixed collimator, the set of optics providing a numerical aperture (NA) of less than 0.85 and an optical path length having a distance from a surface of the optical disc to a focal point within the optical disc that is 75 um to 100 um; and
    a detector for detecting laser light focused on a multi-layer optical disc to produce a stream of detected bits.

2. The device of claim 1, wherein the set of optics provides a NA of 0.75 or less.

3. The device of claim 2, wherein the set of optics provides a NA of 0.65 or more, but less than the 0.85.

4. The device of claim 1, wherein the set of optics has optical path length of 87.5 um or approximately thereof.

5. The device of claim 1, wherein the set of optics has optical path length of exactly or approximately halfway between a first readable layer and a second readable layer of the optical disc.

6. The device of claim 1, wherein the multi-layered optical disc is a Blu-ray disc.

7. The device of claim 6, wherein the laser diode is capable of emitting blue-violet light.

8. The device of claim 6, wherein the set of optics has optical path length of exactly or approximately halfway between a first readable layer and a second readable layer of the Blu-ray disc.

9. The device of claim 1, wherein the laser diode is configured to provide a tangential oval spot (TOS) on the optical disc.

10. The device of claim 1, further comprising an estimator configured to produce an estimated stream of bits using the stream of detected bits based in a Partial Response Maximum Likelihood (PRML) algorithm.

11. The device of claim 1, wherein the fixed collimator does not include active collimator control.

12. A method for reading multi-layered optical discs, comprising:
    emitting laser light through a set of optics including a fixed collimator, the set of optics providing a numerical aperture (NA) of substantially less than 0.85 and an optical path length having a distance from a surface of the optical disc to a focal point within the optical disc that is 75 um to 100 um; and detecting laser light focused on a multi-layer optical disc to produce a stream of detected bits.

13. The method of claim 12, wherein the set of optics provides a NA of 0.75 or less.

14. The method of claim 13, wherein the set of optics provides a NA of 0.65 or more, but less than the 0.85.

15. The method of claim 12, wherein the set of optics has optical path length of 87.5 um or approximately thereof.

16. The method of claim 12, wherein the set of optics has optical path length of exactly or approximately halfway between a first readable layer and a second readable layer of the optical disc.

17. The method of claim 12, wherein the multi-layered optical disc is a Blu-ray disc.

18. The method of claim 17, wherein the laser diode is capable of emitting blue-violet light.

19. The method of claim 17, wherein the set of optics has optical path length of exactly or approximately halfway between a first readable layer and a second readable layer of the Blu-ray disc.

20. The method of claim 12, wherein the laser diode is configured to provide a tangential oval spot (TOS) on the optical disc.

21. The method of claim 12, further comprising producing an estimated stream of bits using the stream of detected bits based in a Partial Response Maximum Likelihood (PRML) algorithm.

22. The method of claim 12, wherein the fixed collimator does not include active collimator control.

* * * * *